(12) United States Patent
Villaume et al.

(10) Patent No.: US 8,160,756 B2
(45) Date of Patent: Apr. 17, 2012

(54) METHOD AND DEVICE FOR GENERATING A SPEED FOR AN AIRCRAFT DURING A TAXIING

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 593 days.

(21) Appl. No.: 12/330,344

(22) Filed: Dec. 8, 2008

(65) Prior Publication Data

US 2009/0150008 A1    Jun. 11, 2009

(30) Foreign Application Priority Data

Dec. 11, 2007 (FR) ..................... 07 08600

(51) Int. Cl.
*G05D 1/08* (2006.01)
(52) U.S. Cl. .......................................... 701/7
(58) Field of Classification Search ............... 701/3–4, 701/7, 13–16, 18, 120, 213
See application file for complete search history.

(56) References Cited

U.S. PATENT DOCUMENTS 4,122,522 A    10/1978   Smith
6,571,166 B1 *  5/2003   Johnson et al. ............... 701/120
2004/0026992 A1  2/2004  Villaume
2007/0208466 A1  9/2007  Meunier

FOREIGN PATENT DOCUMENTS

| DE | 43 04 562 | 8/1994 |
| FR | 2 895 726 | 7/2007 |
| WO | 02/47977 | 6/2002 |

OTHER PUBLICATIONS

Preliminary Search Report dated Jun. 17, 2008 w/ English translation.

* cited by examiner

*Primary Examiner* — Kim T Nguyen
(74) *Attorney, Agent, or Firm* — Dickinson Wright PLLC

(57) ABSTRACT

Disclosed is a system for generating a controlled speed for an aircraft along a ground trajectory. The system provides for receiving a ground trajectory of the aircraft and the speed profile of the aircraft. An interpolated speed of the aircraft is calculated on the basis of the ground trajectory, the speed profile and the current position; a weighting factor is calculated from an angular deviation, which is calculated from a measured current aircraft heading and the ground trajectory; an auxiliary speed is determined from the calculated interpolated speed; and the determined auxiliary speed is multiplied by the weighting factor to generate the controlled speed.

6 Claims, 6 Drawing Sheets

METHOD AND DEVICE FOR GENERATING A SPEED FOR AN AIRCRAFT DURING A TAXIING

FIELD OF THE INVENTION

The present invention relates to a method and a device for generating a controlled speed for an aircraft rolling on the ground along a trajectory.

BACKGROUND OF THE INVENTION

The present invention applies to the rolling of an aircraft on the ground, in particular an airplane, civil or military, for transporting passengers or merchandise (freight), or else a drone (pilotless aircraft). It relates more particularly to an automatic longitudinal guidance making it possible to slave the speed of an aircraft rolling on the ground to a speed profile (which is associated with a ground trajectory).

Within the framework of the present invention, the following meanings are implied:
  rolling on the ground implies any type of possible rolling of an aircraft, such as rolling on a landing runway in the course of the landing and takeoff phases, or rolling on trafficways or on maneuvering areas, in particular; and
  automatic longitudinal guidance implies the action of a system capable of ensuring, partially or totally, that is to say without aid or with the partial aid of a (human) operator, the driving of an aircraft on the ground according to its longitudinal axis.

Currently, the (human) pilot controls the longitudinal movements of the aircraft (that is to say its speed and/or its acceleration) on the ground, with the aid of manual piloting facilities (for example the lever for controlling the thrust of the engines and the pedals of the brakes), along a ground trajectory. These facilities make it possible to control actuators of the aircraft capable of influencing the longitudinal movements of the aircraft, in particular by way of the engines and brakes or any type of means liable to act on the longitudinal movements of the aircraft.

The term ground trajectory designates the pathway followed by the aircraft on an airport domain such as an aerodrome or an airport, including in particular the takeoff and landing runways, the trafficways or taxiways, the turn-around areas, the waiting zones, the stop bars, the stopping positions (stand), the maneuvering areas, and the parking areas.

The ground trajectory is generally provided to the pilot, in particular by way of radiocommunication means or another customary means such as a digital data transmission link, by an air traffic controller or ground controller, but it can also, in certain cases, be chosen freely by the pilot.

The trajectory is defined in the form of a succession of elements of the airport domain, and it indicates a pathway making it possible to attain, from one point (or region) of the airport domain, another point (or region) of this domain.

Any portion of the domain, whether or not designated by a name, and identified as a distinct and delimited part of the domain, is called an element of the airport domain. An element may optionally overlap one or more others. The takeoff and landing runways, the trafficways or taxiways, the turn-around areas, the waiting zones, the stop bars, the stopping positions (stand), the maneuvering areas and the parking areas are in particular designated as elements.

Knowing the ground trajectory to be followed, the pilot acts on the aforesaid piloting facilities, so as to control the longitudinal movements of the aircraft on the ground, in such a way as to pilot the aircraft, in particular during a taxiing phase, at a speed compatible, in particular, with the airport regulations and the comfort of the passengers.

Such manual piloting of an aircraft on the ground constitutes a significant workload for the pilot. The latter must in fact follow the scheduled trajectory by controlling the speed of the aircraft with the engine thrust levers and with the brake pedals, while taking care not to depart from the pavement designed for the rolling of the aircraft, and while simultaneously monitoring the exterior environment, and in particular:
  the movements of the other vehicles traveling around the airport domain, in particular aircraft currently rolling on the ground, taking off or landing, cars, trucks, etc.; and
  the obstacles present around the aircraft and liable to cause a collision with the latter, in particular buildings, gangways, antennas, indication and signaling panels, and other vehicles on the ground, stationary or otherwise (aircraft, cars, trucks, mobile gangways).

This significant workload may, consequently, influence the pilot's vigilance, and lead, in particular, to the following of an unscheduled trajectory, departures from the pavement designed for the rolling of the aircraft, and collisions with other vehicles or obstacles that may lead to significant damage to equipment and humans.

Additionally, when a speed profile associated with the trajectory to be followed is available, the manual piloting of an aircraft on the ground is not optimal in terms of use of the actuators. Specifically, the significant response time of the actuators, in particular that of the engines, can give rise to significant transient deviations in speed between the setpoint and the actual tracking, the consequence of which is to give rise to not-inconsiderable delays in the arrival time scheduled by the speed profile. These limitations play a part in particular in the congestion of large national and international airports and in the delays that penalize both airlines and passengers.

Furthermore, although regulatory and operational limits exist, the speed of the aircraft is left to the free judgment of the pilot. Specifically, no device currently exists which is capable of limiting an excessive speed of the aircraft while rolling on the ground, such as to maintain the speed within limits compatible with, for example, the airport regulations, the comfort of the passengers, the state of the pavement and tires, and the loads on the main gear of the aircraft.

SUMMARY OF THE INVENTION

The object of the present invention is to remedy the aforesaid drawbacks. It relates to a method making it possible to generate a controlled speed for an aircraft rolling on the ground along a trajectory while complying with a speed profile.

For this purpose, according to the invention, said method is noteworthy in that the following successive steps are carried out in a repetitive and automatic manner:
a) said trajectory, which comprises a series of successive elements, is received together with a speed profile which defines, for each element of the trajectory, speed values which are for example associated with positions (expressed preferably in the form of curvilinear abscissae) defined along this element;
b) at least the current position of the aircraft is measured;
c) an interpolated speed which represents a speed value of the speed profile corresponding to the current position of a control point of the aircraft is calculated on the basis of said trajectory, of said speed profile and of said current position;
d) a weighting factor is determined; and e) an auxiliary speed is determined on the basis of said interpolated speed and is multiplied by said weighting factor so as to obtain said controlled speed which represents a longitudinal speed command enabling the aircraft to be made to roll on the ground along said trajectory while complying with said speed profile Thus, by virtue of the invention, a controlled speed is obtained for an aircraft, in particular a transport airplane, which enables it to roll on the ground along a predefined trajectory while complying with a speed profile.

As specified below, the method in accordance with the invention therefore makes it possible to generate, on the basis of a predefined trajectory and of a speed profile which is associated with this predefined trajectory, a speed command (namely a controlled speed) which is such that:

the speed of the aircraft follows, as a function of the position of said aircraft along this trajectory, the associated speed profile; and the speed of the aircraft remains compatible with a certain number of operational and regulatory constraints, such as, in particular, the airport regulations, the comfort of the passengers, the state of the pavement and tires, and the loads on the main gear of the aircraft.

In a particular embodiment, in step d):

the current heading of the aircraft is measured;

an angular deviation is determined on the basis of said measured current heading and of said trajectory; and said weighting factor is calculated with the aid of said angular deviation.

Additionally, in a first simplified embodiment, said auxiliary speed corresponds to said interpolated speed.

Furthermore, in a second preferred embodiment:

a first predicted speed is determined, representing a predicted speed of engines illustrating the dynamics of the engines of the aircraft;

a first predictive control is calculated on the basis of this first predicted speed;

a second predicted speed is determined, representing a predicted speed of brakes illustrating the dynamics of the brakes of the aircraft;

a second predictive control is calculated on the basis of this second predicted speed; and said auxiliary speed is determined on the basis of said interpolated speed, of said first and second predicted speeds and of said first and second predictive controls.

In this second embodiment, in an advantageous manner, to determine said first predicted speed:

the current longitudinal speed of the aircraft is measured; and said first predicted speed is determined on the basis of said trajectory, of said speed profile, of said measured current position and of said measured current longitudinal speed.

Moreover, in this second embodiment, in an advantageous manner, said second predicted speed is also determined on the basis of said trajectory, of said speed profile, of said measured current position and of said measured current longitudinal speed.

Additionally, in a particular embodiment:

the current yaw rate of the aircraft is measured; and at least on the basis of this current yaw rate, said controlled speed is limited if appropriate so as to avoid too high a speed.

The present invention also relates to a procedure for the longitudinal guidance of an aircraft, in particular a transport airplane, which rolls on the ground along a trajectory, in particular on an airport domain.

According to the invention, this guidance procedure is noteworthy in that the following series of successive operations is carried out in an automatic and repetitive manner:

A/ a controlled speed is generated by implementing the aforesaid method;

B/ setpoints able to be applied to control means which act on the speed of the aircraft are calculated, said setpoints being such that applied to said control means the latter pilot the aircraft longitudinally according to said controlled speed; and C/ the setpoints thus calculated are applied to said control means.

This procedure for the automatic guidance of the aircraft following the longitudinal axis along a predefined trajectory, as well as the aforesaid method, are advantageous, in particular for the following reasons, which will be specified further hereinafter:

they make it possible to reduce the workload of the pilot in the course of a movement phase, by handling the tracking of the speed profile of the aircraft on the ground, thereby enabling the pilot to concentrate on other tasks, such as the lateral guidance of the aircraft, the monitoring of the exterior environment (movements of the other vehicles, surrounding obstacles) or communications with the air/ground traffic control;

they make it possible to follow the envisaged speed profile with greater precision than with manual piloting so as to comply as far as possible with the time and arrival constraints which are envisaged by this speed profile;

they allow a more optimized use of actuators of the aircraft than by manual piloting, with in particular fewer activations of the brakes and engines; and they make it possible to monitor, and optionally to limit, the controlled speed so as to comply with the aforesaid operational and regulatory constraints. This is advantageous in particular in the case where the lateral guidance, that is to say the orientation of the aircraft with a view to following the trajectory, is carried out in manual mode, so as, in particular, to be able to automatically limit the speed as a function of the yaw moments of the aircraft, of the state of the pavement and tires, as well as of admissible loads on the main gear of the aircraft. Furthermore, in the case where the lateral guidance is carried out in an automatic manner, the method and the procedure in accordance with the invention make it possible to check that the speed envisaged by the speed profile complies properly with the aforesaid constraints.

Additionally, the present invention relates to a device for generating a controlled speed for an aircraft rolling on the ground along a trajectory. This device is noteworthy, according to the invention, in that it comprises:

means for receiving said trajectory which comprises a series of successive elements;

means for receiving a speed profile which defines, for each element of the trajectory, speed values which are for example associated with positions (expressed preferably in the form of curvilinear abscissae) defined along this element;

means for automatically measuring at least the current position of the aircraft;

means for automatically calculating, on the basis of said trajectory, of said speed profile and of said current position, an interpolated speed which represents a speed value of the speed profile corresponding to the current position of a control point of the aircraft;

means for automatically determining a weighting factor; and means for automatically determining, on the basis of said interpolated speed, an auxiliary speed which is multiplied by said weighting factor so as to obtain said controlled speed (which represents a longitudinal speed command enabling the aircraft to be made to roll on the ground along said trajectory while complying with said speed profile).

This device can be integrated into a system for the automatic longitudinal guidance of an aircraft rolling on the ground, which comprises, according to the invention, in addition to said device which is intended to generate a controlled speed:

- control means which act on the speed of the aircraft;
- means for calculating setpoints able to be applied to said control means, said setpoints being such that applied to said control means the latter pilot the aircraft longitudinally according to said controlled speed; and
- means for applying the setpoints thus calculated to said control means.

The present invention also relates to an aircraft, in particular a transport airplane, civil or military, which comprises a device and/or a system, such as those aforesaid.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 2:
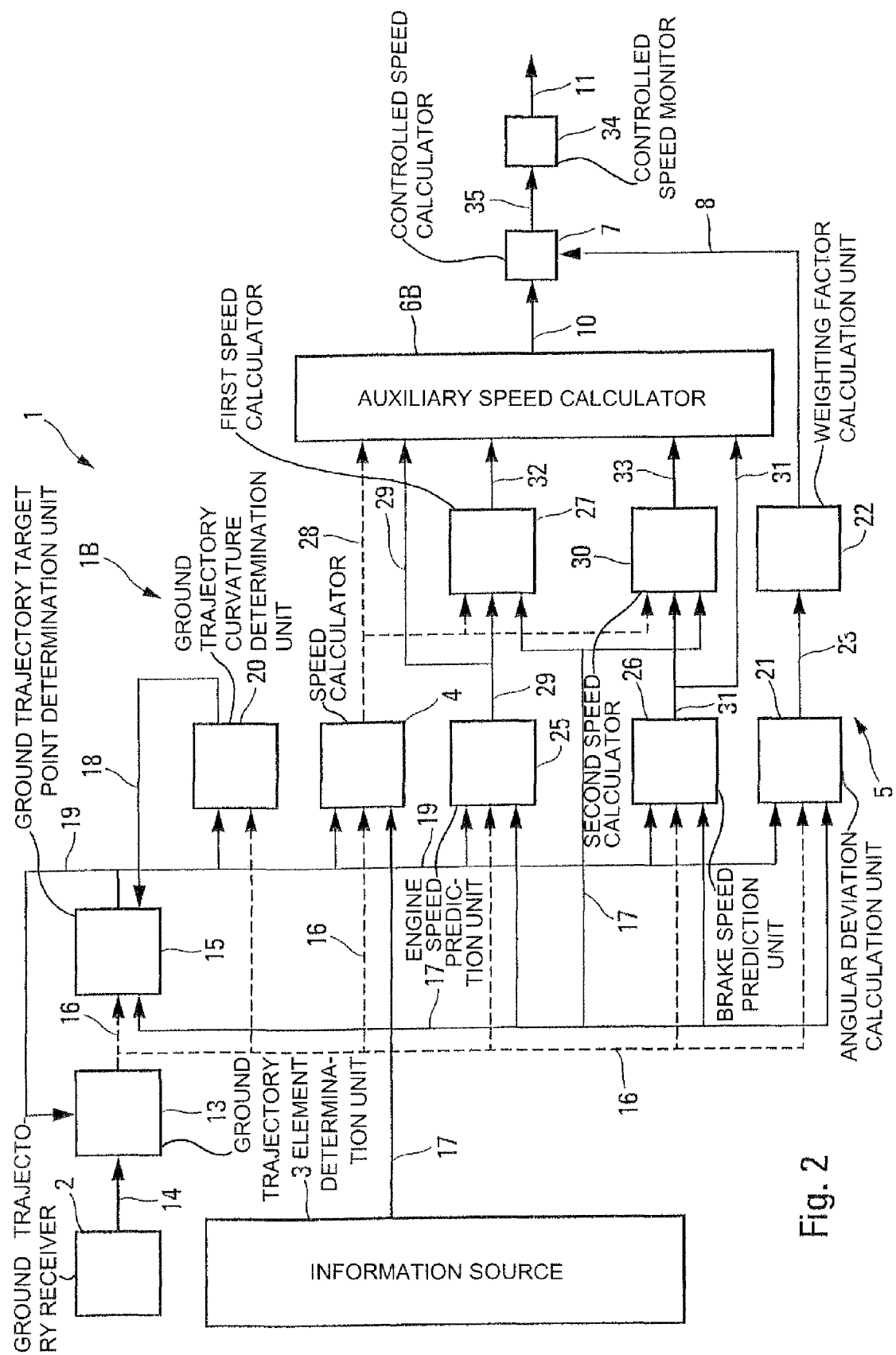
Figure 3:
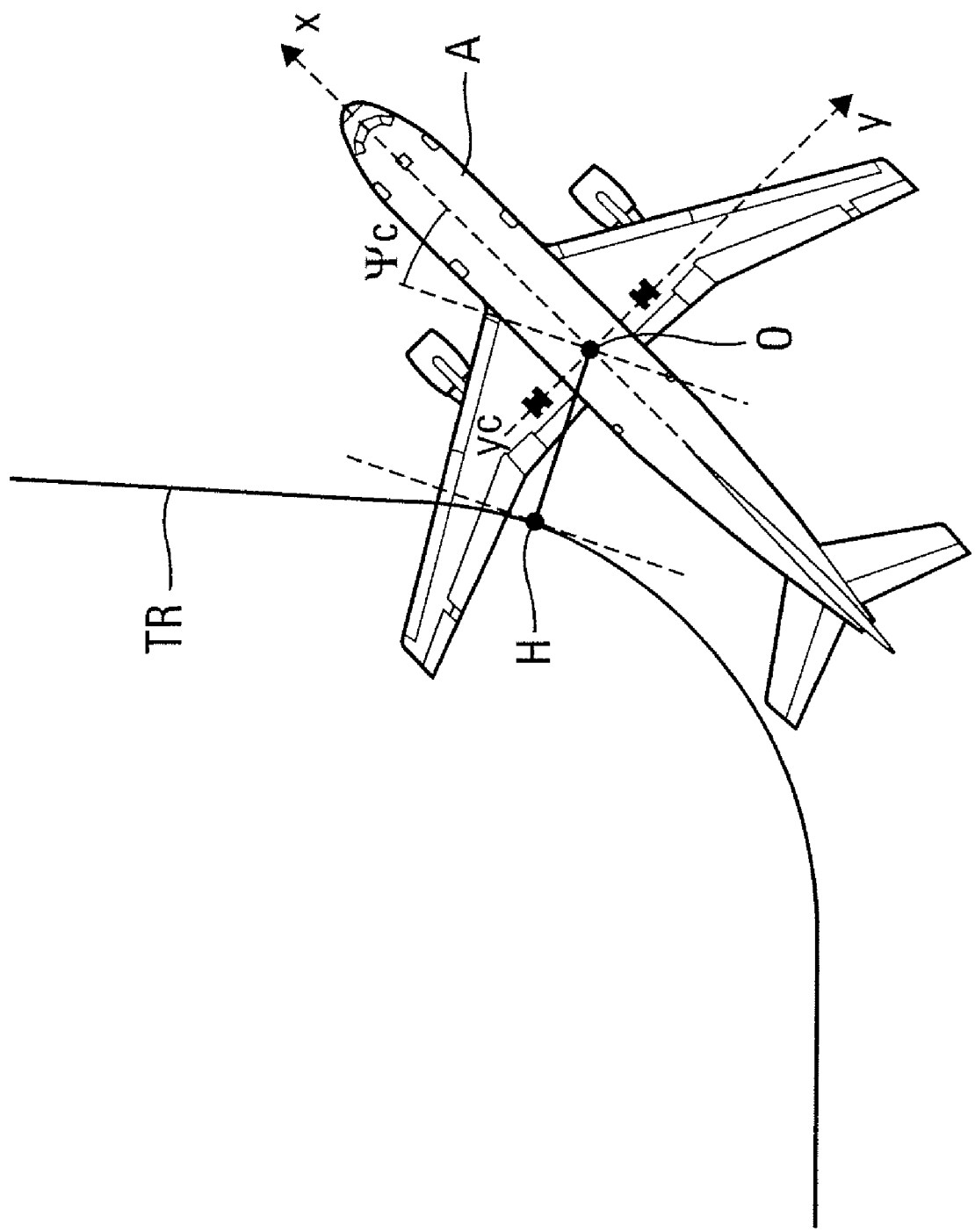
FIG. 3 schematically illustrates, in plan view, the rolling on the ground of an aircraft along a trajectory.

The device 1 in accordance with the invention and represented schematically according to two different embodiments 1A and 1B, in FIGS. 1 and 2 respectively, is intended to generate a controlled speed for an aircraft A, in particular a transport airplane, which rolls on the ground along a ground rolling trajectory TR (as represented in FIG. 3), while complying with a speed profile PV specified below.

The expression ground (rolling) trajectory TR is understood to mean the pathway followed by the aircraft A on an airport domain such as an airport or an aerodrome, including in particular the takeoff and landing runways, the trafficways or taxiways, the turn-around areas, the waiting zones, the stop bars, the stopping positions (stand), the maneuvering areas, and the parking areas.

It is assumed that the trajectory TR to be followed is a continuous line connecting two points of the airport domain, and can be described in mathematical form, for example in the form of a succession of straight segments, circular or elliptic arcs, clothoids, NURBSs, splines (in particular Bézier curves), or a combination of the above curves, or any other possible description of a curve.

Figure 4:
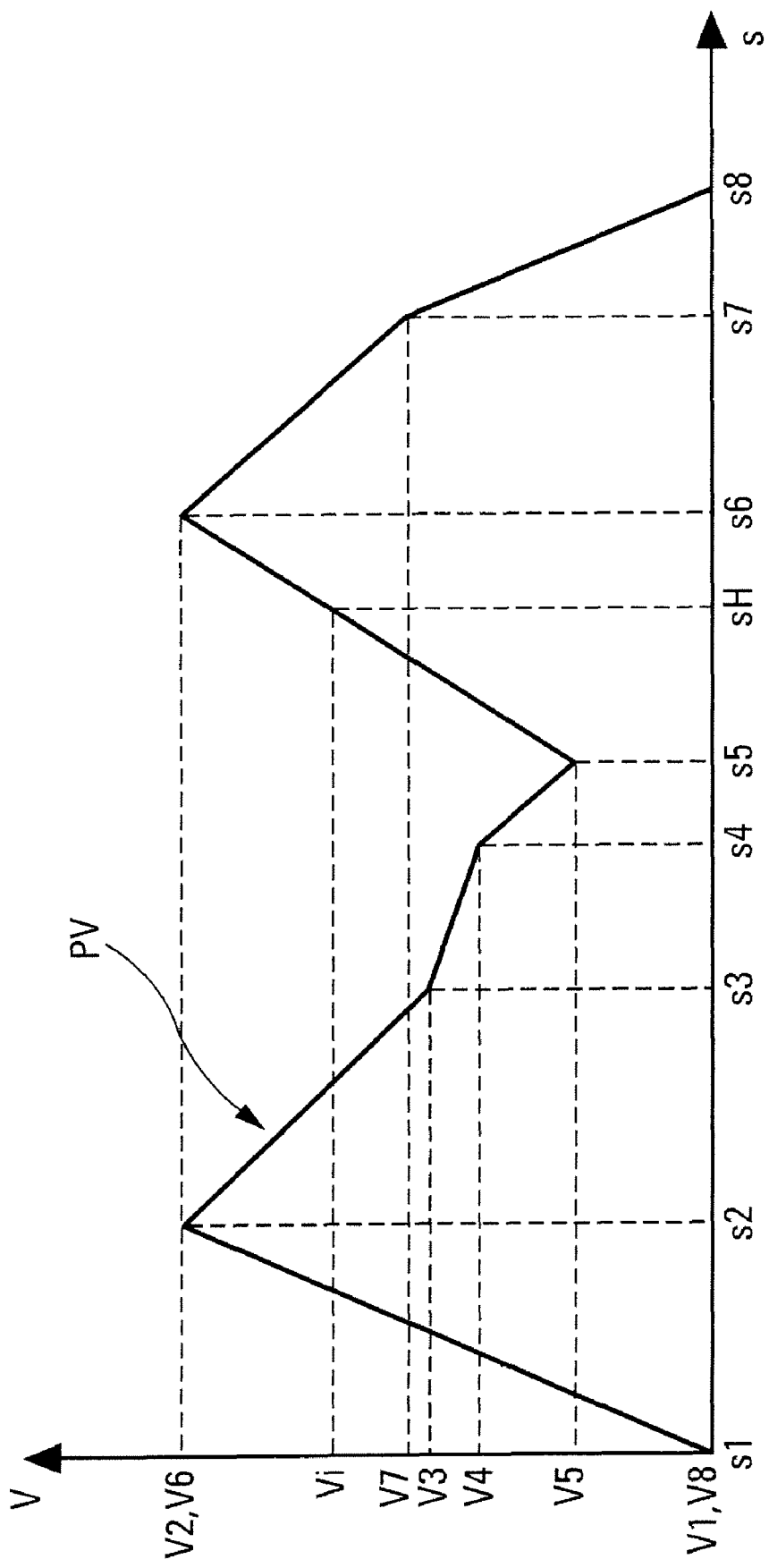
FIG. 4 is a graph illustrating a speed profile.

Within the framework of the present invention, the expression speed profile PV which is associated with a trajectory TR (for rolling on the ground), is understood to mean a set of values of the speed V corresponding either to a set of positions (expressed for example in the form of curvilinear abscissae s) along this trajectory, as represented in FIG. 4, or to a set of time values. These two sets (speeds/positions or speeds/times) possess the same number of elements (s1 to s8 and V1 to V8) so that, in the example of FIG. 4, with a position s1 is associated a speed V1, with a position s2 is associated a speed V2, etc., and with a position s8 is associated a speed V8. FIG. 2 also represents a current position sH with the corresponding speed Vi such as defined by said speed profile PV.

Figure 1:
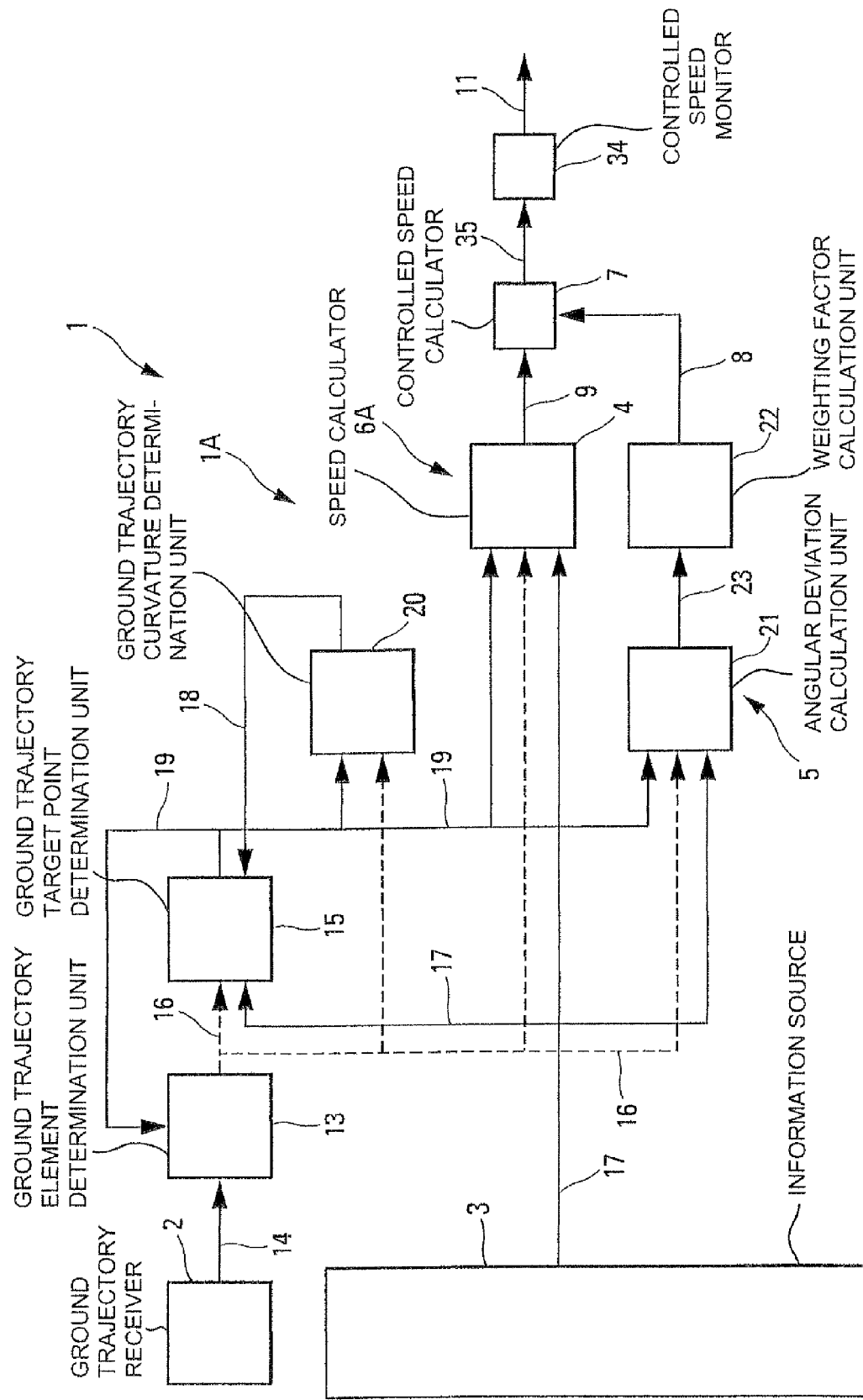
FIGS. 1 and 2 are the schematic diagrams of two different embodiments of a device in accordance with the invention for generating a controlled speed for an aircraft rolling on the ground.

According to the invention, said device 1 which is onboard, comprises, as represented in FIGS. 1 and 2:

- means 2 for receiving said rolling trajectory TR on the ground, which comprises a series of successive elements of the airport domain, indicating a pathway making it possible, to regain, from one point or region of the airport domain, another point or region of said domain. Any portion of the domain, whether or not designated by a name, and identified as a distinct and delimited part of the domain, is called an element of the airport domain. The elements may relate, in particular, to the takeoff and landing runways, the trafficways or taxiways, the turn-around areas, the waiting zones, the stop bars, the stopping positions (stand), the maneuvering areas and the parking areas;
- a set 3 of information sources, which comprises in particular standard means for measuring the current position and the current heading of said aircraft A. This set 3 can also comprise generation means for generating, in a standard manner, a speed profile PV which therefore defines, for each element of the trajectory TR, speed values which are for example associated with curvilinear abscissae existing along this element, as represented in FIG. 4. These generation means can also form part of said means 2;
- means 4 for automatically calculating, on the basis of said trajectory TR, of said speed profile PV and of said current position, an interpolated speed Vi which represents a speed value of the speed profile PV corresponding to the current position sH of a control point O of the aircraft A;
- means 5 for automatically determining a weighting factor λweight;
- means 6A, 6B for automatically determining, on the basis of the interpolated speed Vi, an auxiliary speed; and
- a calculation means 7 for multiplying this auxiliary speed by said weighting factor λweight so as to obtain a controlled speed Vc which represents a longitudinal speed command enabling the aircraft A to be made to roll on the ground along said trajectory TR while complying with said speed profile PV.

This controlled speed Vc can be provided to a user system, as specified below, by way of a link 11.

Figure 5:
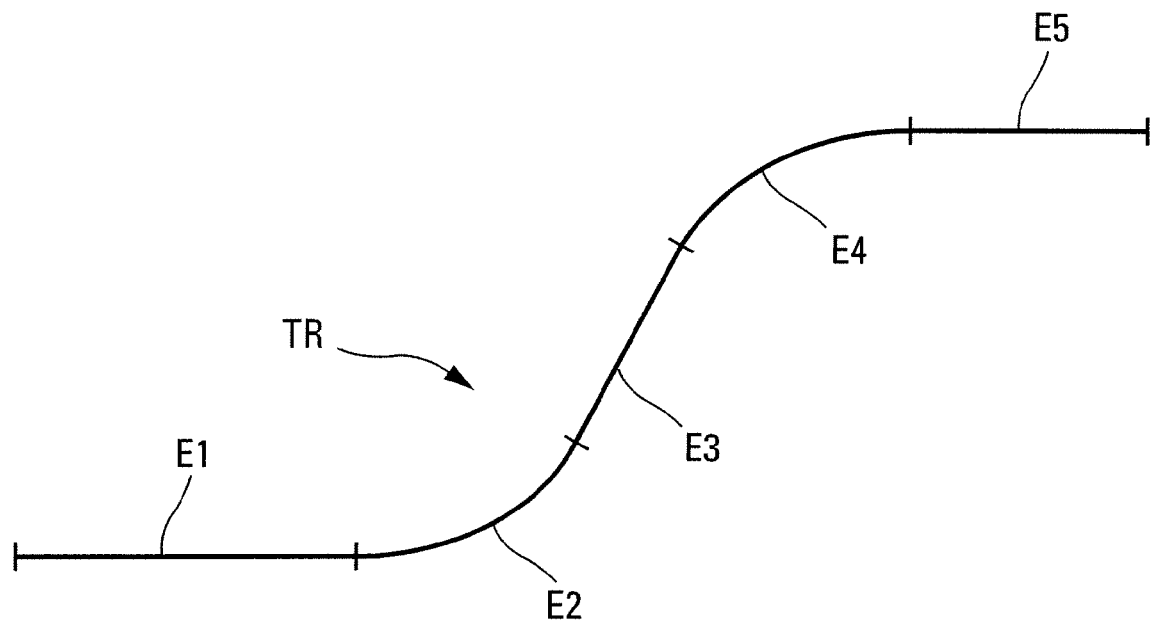
FIG. 5 schematically represents a particular example of a ground trajectory.

Furthermore, the device 1 in accordance with the invention comprises, moreover:

- means 13 which are connected by way of a link 14 to said means 2 and which are intended to determine a current element Ec of the trajectory TR which comprises a plurality of successive elements E1 to E5, as represented by way of example in FIG. 5;
- means 15 which are connected by way of a link 16 to said means 13, by way of a link 17 to said set 3, and by way of a link 19 to said means 4 and 13 in particular (as represented in FIGS. 1 and 2) and which are formed so as to calculate, in the manner specified below, a target point H of the trajectory TR; and means 20 which determine the current curvature cc at this current target point H of the trajectory TR.

Additionally, said means 5 which are intended to calculate the weighting factor λweight which is transmitted through a link 8 to said calculation means 7 comprise:

a calculation element 21 which receives, as input, information by way of the links 16, 17 and 19 and which determines, on the basis of this information and in particular on the basis of the measured current heading and of the trajectory TR, an angular deviation ψc; and a calculation element 22 which is connected by way of a link 23 to said calculation element 21 and which calculates, on the basis of said angular deviation ψc, said weighting factor λweight, as specified below.

In a particular embodiment, said device 1 also comprises means 34 specified below, for monitoring the controlled speed Vc received from the calculation means 7 through a link 35 and optionally for limiting it, before transmitting it through the link 11.

Said means 2, 4, 5, 7, 13, 15, 20 and 34 are identical in the two embodiments 1A and 1B of the device 1, represented respectively in FIGS. 1 and 2.

In particular, said means 2 can comprise:

input means, in particular a keyboard, allowing an operator, in particular the pilot of the aircraft A, to input characteristics of the trajectory TR into the device 1; and/or reception means making it possible to receive automatically and directly from outside the aircraft, in particular from a post intended for the air traffic control or for the ground control, in particular with the aid of a data transmission link (not represented), information making it possible to characterize said trajectory TR.

Additionally, said means 20 which are connected by the (incoming) links 16 and 19 to said means 13 and 15 and by an (outgoing) link 18 to said means 15 determine the current curvature cc in the manner indicated below.

In the general case where the curvature is not zero at any point (the case of straight segments), the local curvature $c(s)$ at a point $s \in [0;1]$ of a parameterized plane curve $Z(s)$ is given by the following standard relation:

$$c(s) = \frac{Z1(s)x \cdot Z2(s)y - Z1(s)y \cdot Z2(s)x}{(Z1(s)x^2 + Z1(s)y^2)^{3/2}}$$

in which:

$Z1(s)x$ and $Z1(s)y$ are the coordinates of the first derivative $Z1(s)$ of the curve $Z(s)$; and $Z2(s)$ x and $Z2(s)$ y are the coordinates of the second derivative $Z2(s)$ of the curve $Z(s)$ [that is to say of the derivative of $Z1(s)$].

In the case where the family of curves used is the family of cubic Bézier curves (according to a preferred variant embodiment), the expressions for the functions used in the formula above are given hereinafter:

$$Z1(s) = \begin{cases} Z1(s)x \\ Z1(s)y \end{cases} =$$

$$\begin{cases} 3(-Ax+Bx)(1-s)^2 + 6(-Bx+Cx)(1-s)s + 3(-Cx+Dx)s^2 \\ 3(-Ay+By)(1-s)^2 + 6(-By+Cy)(1-s)s + 3(-Cy+Dy)s^2 \end{cases}$$

$$Z2(s) = \begin{cases} Z2(s)x \\ Z2(x)y \end{cases} = \begin{cases} 6(Ax-2Bx+Cx)(1-s) + 6(Bx-2Cx+Dx)s \\ 6(Ay-2By+Cy)(1-s) + 6(By-2Cy+Dy)s \end{cases}$$

Figure 6:
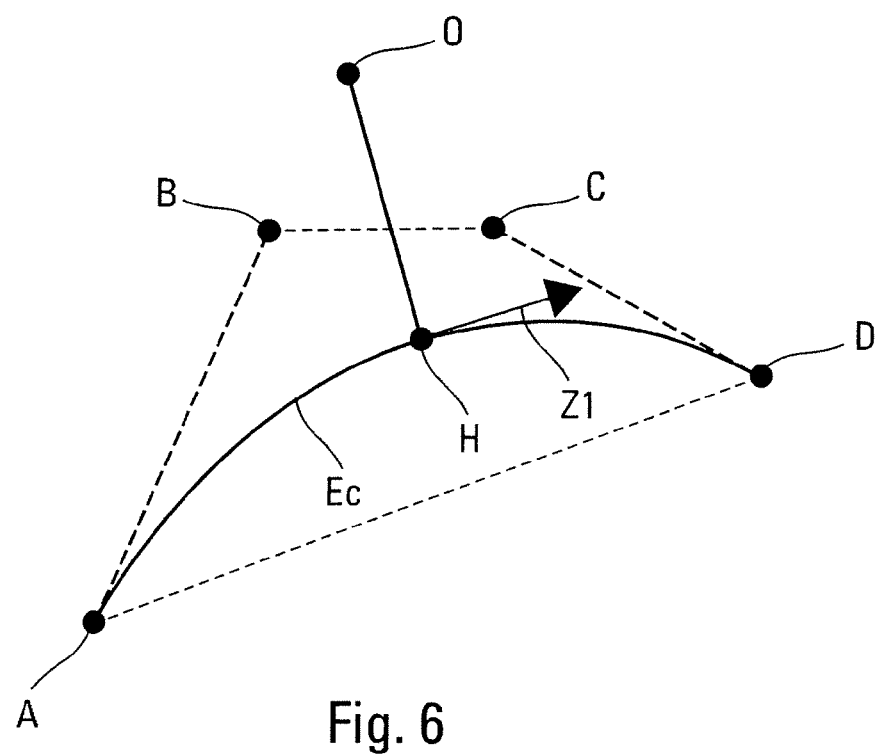
FIG. 6 is a diagram making it possible to explain the characteristics of cubic Bézier curves, used in a preferred embodiment of the invention.

A, B, C and D are the four points which define in a standard manner a cubic Bézier curve, as represented in FIG. 6, and the pairs (Ax, Ay), (Bx, By), (Cx, Cy) and (Dx, Dy) are the coordinates of these points A, B, C and D in a horizontal plane. In the subsequent description, all the parameters referenced by x or y refer to the coordinates of this plane.

Additionally, within the framework of the present invention, said means 15 intended to determine the position of the target point H on the trajectory TR can be embodied according to different variant embodiments.

A first variant embodiment corresponds to the case where the trajectory TR consists of straight line segments. The normed curvilinear abscissa sH of the target point H is given by the following relation:

$$sH = \frac{(Bx-Ax)(Ox-Ax) + (By-Ay)(Oy-Ay)}{(Bx-Ax)^2 + (By-Ay)^2}$$

where O is the point of the aircraft A that one seeks to slave, and A and B the ends of the segment forming the trajectory element considered.

The coordinates of the target point H are given by the following relation:

$$H = \begin{cases} Ax(1-sH) + BxsH \\ Ay(1-sH) + BysH \end{cases}$$

In a second variant embodiment, corresponding to the determination of the target point on an arbitrary parametrized curve, for example a NURBS curve, a spline, and in particular a Bézier curve (quadratic (order 2), cubic (order 3), or of any higher order), the means 15 are furnished with a mathematical computer (not represented) making it possible to find the roots sH of the following equation numerically:

$$Z1(sH)x(Ox-Z(sH)x) + Z1(sH)y(Oy-Z(sH)y) = 0$$

with, in the case where $Z(s)$ is a cubic Bézier curve:

$$Z(s) = \begin{cases} Z(s)x \\ Z(s)y \end{cases} = \begin{cases} Ax(1-s)^3 + 3Bx(1-s)^2 s + 3Cx(1-s)s^2 + Dxs^3 \\ Ay(1-s)^3 + 3By(1-s)^2 s + 3Cy(1-s)s^2 + Dys^3 \end{cases}$$

$$Z1(s) = \begin{cases} Z1(s)x \\ Z1(s)y \end{cases} =$$

$$\begin{cases} 3(-Ax+Bx)(1-s)^2 + 6(-Bx+Cx)(1-s)s + 3(-Cx+Dx)s^2 \\ 3(-Ay+By)(1-s)^2 + 6(-By+Cy)(1-s)s + 3(-Cy+Dy)s^2 \end{cases}$$

O with coordinates Ox and Oy is the control point of the aircraft A that one seeks to slave.

The real root sH lying between 0 and 1 corresponds to the current normed curvilinear abscissa and makes it possible to deduce the coordinates of the target point H by virtue of the following equation:

$$H = \begin{cases} Hx \\ Hy \end{cases} = \begin{cases} Ax(1-sH)^3 + 3Bx(1-sH)^2 sH + 3Cx(1-sH)sH^2 + DxsH^3 \\ Ay(1-sH)^3 + 3By(1-sH)^2 sH + 3Cy(1-sH)sH^2 + DysH^3 \end{cases}$$

In a third variant embodiment, the means 15 carry out a numerical approximation, either by searching for a minimum (gradient or Newton type for example), or by calculating the value of a lateral deviation yc for a (fixed or variable) number of values of s. The value sH corresponding to the smallest value found of the lateral deviation yc (represented in FIG. 3) between the target point H and the point O (control point of the aircraft A that one seeks to slave to the trajectory TR) is then retained.

In a fourth variant embodiment, the means 15 use a neural net (for example, a multilayer perceptron) to determine the coordinates of the target point H by modeling the behavior of the equation of the aforesaid second variant.

In a fifth variant embodiment, the means 15 use a so-called "incremental" procedure to determine the position of the target point H, applicable to any family of curves with non-zero curvature. This procedure is as follows:
the recurrence is initialized with $$\begin{cases} l[o] = 0 \\ sH[o] = 0 \end{cases}$$

at each instant n, the following sequence is calculated:

$$R[n+1] = \begin{pmatrix} Z(sH[n])x \\ Z(sH[n])y \end{pmatrix} + \frac{1}{c[n]} \cdot \frac{\begin{pmatrix} \overrightarrow{-Z1(sH[n])y} \\ Z1(sH[n])x \end{pmatrix}}{\left\| \overrightarrow{\begin{matrix} -Z1(sH[n])y \\ Z1(sH[n])x \end{matrix}} \right\|}$$

$$J[n+1] = R[n+1] + \frac{1}{|c[n]|} \cdot \frac{\overrightarrow{R[n+1]O[n+1]}}{\|R[n+1]O[n+1]\|}$$

$$l[n+1] =$$

$$l[n] + \text{sign}(\overrightarrow{Z(sH[n])J[n+1]} \cdot \overrightarrow{Z1(sH[n])}) \cdot \|\overrightarrow{Z(sH[n])J[n+1]}\|$$

$$sH[n+1] = l[n+1]/L$$

At each instant n, the coordinates of the target point H are then given by:

$$H\langle n\rangle =$$

$$4x(1-sH[n])^3 + 3Bx(1-sH[n])^2 sH[n] + 3Cx(1-sH[n])sH[n]^2 + DxsH[n]^3$$

$$4y(1-sH[n])^3 + 3By(1-sH[n])^2 sH[n] + 3Cy(1-sH[n])sH[n]^2 + DysH[n]^3$$

In the above equations:
O[n] is the position of the point O of the aircraft A to be slaved at the instant n;
c[n] is the curvature at the instant n, counted on the basis of the start of the current curve;
l[n] is the curvilinear abscissa at the instant n;
sH[n] is the normed curvilinear abscissa at the instant n;
H[n] is the position of the target point H on the curve at the instant n; and
L is the total length of the current Bézier curve.

In a sixth variant embodiment, corresponding to the preferred variant, the means 15 implement a combination of the first and fifth aforesaid variants:
when the current element Ec of the trajectory TR is a straight line segment, the position of the target point H is determined by the first variant; and
in the general case (curve with nonzero curvature), the position of the target point H is determined by the fifth variant.

Additionally, if the trajectory TR is composed of several elements (or curves) E1 to E5 to be followed successively, as represented in FIG. 5, the device 1 comprises the means 13 intended to determine the current element Ec of the trajectory TR, that is to say the element which is currently followed by the aircraft A.

In the case (representing the preferred variant embodiment) where the elements E1 to E5 of the trajectory TR are described by Bézier curves (cubic for example), said means 13 provide:
the Bézier coefficients of the current element Ec (that is to say the coordinates of the points defining the Bézier curve); and
the serial number of the current element Ec.

The switch from one trajectory element to the next is done when the following condition is fulfilled:

$$sH > 1$$

where sH is the current normed curvilinear abscissa.

Additionally, said calculation element 21 of the means 5 is formed so as to calculate the current angular deviation ψc between the current (measured) heading ψav of the aircraft A and the angle defined by the tangent of the trajectory at H, by using the following relation:

$$\psi c = \psi av - 2\arctan\left(\frac{Z1(sH)y}{\sqrt{Z1(sH)x^2 + Z1(sH)y^2} + Z1(sH)x}\right)$$

with ψc defined on the interval [−π,π] and arctan the inverse of the tangent.

Furthermore, the weighting factor λweight which is transmitted through the link 8 to the calculation means 7 is calculated by the calculation element 22, preferably as a function of the angular deviation ψc received from the calculation element 21. This weighting factor λweight makes it possible to limit the controlled speed when the aircraft A deviates (from an angular point of view for example) from the trajectory to be followed.

In a first variant embodiment, the calculation element 22 is formed so as to calculate the weighting factor λweight with the aid of the following expression:

λweight(ψc)=1−(2abs(ψc)/π), abs representing the absolute value.

Furthermore, in a second variant embodiment corresponding to the preferred variant embodiment, said calculation element 22 is formed so as to calculate the weighting factor λweight with the aid of the following relation:

λweight(ψc)=cos(ψc)³

Additionally, the means 4 are formed so as to calculate the value of the interpolated speed Vi which represents the speed of the speed profile PV corresponding to the current position sH (expressed preferably in the form of a curvilinear abscissa along the current element Ec of the trajectory TR) of the control point O of the aircraft A. As indicated above, the speed profile PV is such that, for each trajectory element, a series of speed values is associated with a series of normed (that is to say lying between 0 and 1) curvilinear abscissa values at intervals, regular or otherwise, along this trajectory element. The means 4 use the serial number of the current element Ec (provided by the means 13), the current normed curvilinear abscissa sH (provided by the means 15), as well as the speed profile PV, to carry out, on the current trajectory element, an interpolation (for example linear, quadratic, cubic, or any other type of interpolation) of the speed profile PV making it possible to determine the value of the speed Vi corresponding to the current normed curvilinear abscissa sH such as represented in FIG. 4.

The device 1 in accordance with the invention therefore makes it possible to generate a controlled speed Vc for an aircraft A, in particular a transport airplane, which enables it to roll on the ground along a predefined trajectory TR while complying with a speed profile PV. More precisely, said device 1 makes it possible to generate, on the basis of a predefined trajectory TR and of a speed profile PV which is associated with this predefined trajectory, a speed command (namely a controlled speed Vc) which is such that:
- the speed of the aircraft A follows, as a function of the position of said aircraft A along this trajectory TR, the associated speed profile PV; and
- the speed of the aircraft A remains compatible with a certain number of operational and regulatory constraints, such as, in particular, the airport regulations, the comfort of the passengers, the state of the pavement and tires, and the loads on the main gear of the aircraft.

Additionally, in the first embodiment 1A of FIG. 1, said means 6A correspond to said means 4 which calculate the interpolated speed Vi. The aforesaid auxiliary speed therefore corresponds to said interpolated speed Vi. Consequently, in this first embodiment 1A, the controlled speed Vc which is calculated by the calculation means 7 (which is connected by way of a link 9 to said means 6A) and which can be transmitted by the device 1 by way of the link 11, satisfies the following relation:

$$Vc = \lambda \text{weight} \cdot Vi$$

Additionally, in the second embodiment represented in FIG. 2 and corresponding to the preferred embodiment, the device 1B implements a predictive control on the speed profile PV.

For this purpose, said device 1B comprises, moreover:
- means 25 which are connected by way of the links 16, 17 and 19 respectively to said means 13, to said set 3 and to said means 15 and which are formed so as to determine a first predicted speed Vpr1 representing a predicted speed of engines, which illustrates the dynamics of the engines of the aircraft A;
- means 26 which are connected by way of the links 16, 17 and 19 respectively to said means 13, to said set 3 and to said means 15 and which are formed so as to determine a second predicted speed Vpr2 representing a predicted speed of brakes, which illustrates the dynamics of the brakes of the aircraft A;
- means 27 which are connected respectively by way of the links 17, 28 and 29 to said set 3, to said means 4 and to said means 25 and which are formed so as to calculate a first predictive control on the basis of the first predicted speed Vpr1 received from said means 25;
- means 30 which are connected by way of the links 17, 28 and 31 respectively to said set 3, to said means 4 and to said means 26 and which are formed so as to calculate a second predictive control, on the basis of the second predicted speed Vpr2 received from said means 26; and
- calculation means 6B which are connected by way of the links 28, 29, 31, 32 and 33 respectively to said means 4, 25, 26, 27 and 30 and which are formed so as to determine said auxiliary speed (which will be transmitted through a link 10 to said calculation means 7), on the basis of said interpolated speed Vi, of said first and second predicted speeds, and of said first and second predictive controls.

Said means 25 therefore determine the first predicted speed Vpr1, which corresponds to the speed of the speed profile PV at a prediction horizon nH1 (corresponding to the dynamics of the engines, and counted in terms of number of sampling periods τ). For this purpose, it is appropriate to calculate, initially, the normed curvilinear abscissa sp1 attained at this prediction horizon nH1. Accordingly, the following notation will be employed:
- Vx the longitudinal speed of the aircraft A;
- nH1 the prediction horizon, counted in terms of number of sampling periods (adjustment procedure described hereinafter);
- τ the sampling period of the prediction algorithm;
- Lc the length of the current trajectory element Ec;
- Lc+1 the length of the next trajectory element;
- sH the current normed curvilinear abscissa; and
- sp1 the normed curvilinear abscissa at the prediction horizon nH1.

We denote by sf1 the magnitude which is equal to $$sH + \frac{V \times nH1\tau}{Lc}$$

If sf1<1, then the predicted normed curvilinear abscissa sp1 equals:

$$sp1 = sf1 = sH + \frac{V \times nH1\tau}{Lc}$$

Otherwise (that is to say if sf1≧1), the predicted normed curvilinear abscissa sp1 equals:

$$sp1 = \left[\left(sH + \frac{V \times nH1\tau}{Lc}\right) - 1\right] \cdot \frac{Lc}{Lc+1}$$

Furthermore:
- if sf1 is less than 1, the means 25 consider the part of the speed profile which corresponds to the current element Ec of the trajectory TR, and they perform the interpolation of the profile so as to determine the value Vpr1 of the speed profile PV corresponding to the predicted normed curvilinear abscissa sp1; and
- if sf1 is greater than or equal to 1, the means 25 consider the part of the speed profile corresponding to the next element of the trajectory TR, and they perform the interpolation of the profile so as to determine the value Vpr1 of the speed profile PV corresponding to the predicted normed curvilinear abscissa sp1.

Additionally, said means 26 determine the second predicted speed Vpr2, which corresponds to the speed of the speed profile PV at a prediction horizon nH2 (corresponding to the dynamics of the brakes, and counted in terms of number of sampling periods τ).

For this purpose, it is appropriate, initially, to calculate the normed curvilinear abscissa sp2 attained at this prediction horizon nH2. Accordingly, the following notation will be employed:
- Vx the longitudinal speed of the aircraft A;
- nH2 the prediction horizon, counted in terms of number of sampling periods (adjustment procedure described hereinafter);
- τ the sampling period of the prediction algorithm;
- Lc the length of the current trajectory element Ec;
- Lc+1 the length of the next trajectory element;
- sH the current normed curvilinear abscissa; and sp2 the normed curvilinear abscissa at the prediction horizon nH2.

We denote by sf2 the magnitude which is equal to $$sH + \frac{V \times nH2\tau}{Lc}$$

If sf2<1, then the predicted normed curvilinear abscissa sp2 equals:

$$sp2 = sf2 = sH + \frac{V \times nH2\tau}{Lc}$$

Otherwise (that is to say if sf2≧1), the predicted normed curvilinear abscissa sp2 equals:

$$sp2 = \left[\left(sH + \frac{V \times nH2\tau}{Lc}\right) - 1\right] \cdot \frac{Lc}{Lc+1}$$

Furthermore:
if sf2 is less than 1, the means 25 consider the part of the speed profile which corresponds to the current element Ec of the trajectory TR, and they perform the interpolation of the profile so as to determine the value Vpr2 of the speed profile PV corresponding to the predicted normed curvilinear abscissa sp1; and if sf2 is greater than or equal to 1, the means 26 consider the part of the speed profile corresponding to the next element of the trajectory TR, and they perform the interpolation of the profile so as to determine the value Vpr2 of the speed profile PV corresponding to the predicted normed curvilinear abscissa sp2.

Additionally, the means 27 are formed so as to carry out a predictive speed control corresponding to the dynamics of the engines. For this purpose, the following notation will be employed:

Vmes[n]=Vx the longitudinal speed of the aircraft A at the instant n;

nH1 the prediction horizon for the dynamics of the engines; and

γ1 an adjustment parameter influencing the reactivity of the predictive control, which lies between 0 (very reactive control) and 1 (very unreactive control).

Additionally, the index [n] corresponds to the present instant, the index [n+1] to the next instant, and the index [n−1] to the previous instant, etc.

The setpoint speed Vc1 arising from the predictive control of the engines is given at the instant n by the following relation:

$$Vc1 = Vc1[n] = \left[\sum_{i=0}^{nH1}(V1(i))^2\right]^{-1} \cdot \left[\sum_{i=0}^{nH1}(d1(n+i) \cdot V1(i))\right]$$

in which:

$$-V1(i) = \sum_{j=0}^{i} C1 \cdot F1(i-j) \cdot K1;$$

$$-C1 = [1\ 0\ 0],\ F1 = \begin{bmatrix} b1 & b2 & a2 \\ 1 & 0 & 0 \\ 0 & 0 & 0 \end{bmatrix};\ K1 = \begin{bmatrix} a1 \\ 0 \\ 1 \end{bmatrix};$$

and where a1, a2, b1 and b2 are the coefficients of the following second order discrete transfer function, representing the dynamics of the engines:

$$T1(z^{-1}) = \frac{a1z^{-1} + a2z^{-2}}{1 + b1z^{-1} - b2z^{-2}}$$

A possible procedure making it possible to find the coefficients a1, a2, b1 and b2 consists in identifying in discrete (for example with the aid of a model ARX) the response of the aircraft A in terms of speed to a positive step change in speed (acceleration), for a mean operating point, and the sampling period of the algorithm;

$$-d1(n+i) = Vpr1(1 - y1i) + y1i \cdot Vmes[n] - C1 \cdot F1i \cdot \begin{pmatrix} Vmes[n] \\ Vmes[n-1] \\ Vc1[n-1] \end{pmatrix}$$

A possible procedure making it possible to adjust the value of the prediction horizon nH1 consists in choosing an initial value of nH1 such that the magnitude nH1·τ is about equal to the response time of the dynamics in terms of speed (acceleration), then by adjusting the prediction horizon empirically during trials, so as to obtain the desired response in terms of speed tracking.

Additionally, said means 30 make it possible to carry out the predictive speed control corresponding to the dynamics of the brakes. For this purpose, the following notation will be employed:

Vmes[n]=Vx the longitudinal speed of the aircraft A at the instant n;

nH2 the prediction horizon for the dynamics of the brakes; and

γ2 an adjustment parameter influencing the reactivity of the predictive control, which lies between 0 (very reactive control) and 1 (very unreactive control).

Additionally, the index [n] corresponds to the present instant, the index [n+1] to the next instant, and the index [n−1] to the previous instant, etc.

The setpoint speed Vc2 arising from the predictive control of the brakes is given at the instant n by the following relation:

$$Vc2 = Vc2[n] = \left[\sum_{i=0}^{nH2}(V2(i))^2\right]^{-1} \cdot \left[\sum_{i=0}^{nH2}(d2(n+i) \cdot V2(i))\right]$$

in which:

$$-V2(i) = \sum_{j=0}^{i} C2 \cdot F2(i-j) \cdot K2;$$

$$-C2 = [1\ 0\ 0],\ F2 = \begin{bmatrix} b3 & b4 & a4 \\ 1 & 0 & 0 \\ 0 & 0 & 0 \end{bmatrix};\ K2 = \begin{bmatrix} a3 \\ 0 \\ 1 \end{bmatrix};$$

and where a3, a4, b3 and b4 are the coefficients of the following second order discrete transfer function, representing the dynamics of the brakes:

$$T2(z^{-1}) = \frac{a3z^{-1} + a4z^{-2}}{1 + b3z^{-1} - b4z^{-2}}$$

A possible procedure making it possible to find the coefficients a3, a4, b3 and b4 consists in identifying in discrete (for example with the aid of a model ARX) the response of the aircraft A in terms of speed to a negative step change in speed (deceleration), for a mean operating point, and the sampling period of the algorithm;

$$-d2(n+i) = Vpr2(1-y2i) + y2i \cdot Vmes[n] - C2 \cdot F2i \cdot \begin{pmatrix} Vmes[n] \\ Vmes[n-1] \\ Vc2[n-1] \end{pmatrix}$$

A possible procedure making it possible to adjust the value of the prediction horizon nH2 consists in choosing an initial value of nH2 such that the magnitude nH2·τ is about equal to the response time of the dynamics in terms of speed (deceleration), then by adjusting the prediction horizon empirically during trials, so as to obtain the desired response in terms of speed tracking.

Additionally, the object of said means 6B is to choose the predictive control to be applied as a function of the form of the speed profile PV. Said means 6B (which receive the speeds Vi, Vpr1, Vpr2, Vc1 and Vc2 respectively from the means 4, 25, 26, 27 and 30) provide, as output, an auxiliary speed Vs, as a function of the following algorithm:

if Vpr2<Vi, Vs=Vc2;
otherwise, that is to say if Vpr2≧Vi:
if Vpr1>Vi, Vs=Vc1;
otherwise, that is to say if Vpr1≦Vi, Vs=Vi This auxiliary speed Vs determined by the means 6B is transmitted (through a link 10) to said calculation means 7 which multiplies it by the weighting factor λweight so as to obtain the controlled speed Vc which therefore satisfies the following relation:

$$Vc = \lambda weight \cdot Vs$$

Additionally, the device 1 can also comprise the means 34 which are connected by way of the link 35 to said calculation means 7 and which can carry out a limitation Vlim of the controlled speed Vc, by taking account preferably of the following relation:

$$Vlim = \min(Vc, (Ny \cdot g)/rmes, Vreg, Vtr, Vadh)$$

in which:
Vc is therefore the controlled speed;
Vlim is therefore the controlled speed after limitation (which will be transmitted through the link 11);
Ny is the lateral load factor;
g is the acceleration due to gravity;
rmes is the measurement of the yaw rate of the aircraft A;
Vreg is the admissible maximum regulatory speed on the airport domain. For example, it is possible to have an admissible maximum speed in a straight line if the curvature is zero, and an admissible maximum speed while turning if the curvature is not zero;
Vtr is the speed corresponding to the admissible maximum load allowed by the main gear, in particular while turning; and
Vadh is the admissible maximum speed which is such that the grip of the tires on the pavement remains sufficient.

Consequently:
in the aforesaid first embodiment 1A, the device 1 comprises means 6A making it possible to determine, as a function of the position of the aircraft A with respect to the trajectory TR, the value of the speed profile PV corresponding to this position. This speed value is thereafter weighted by a weighting factor λweight, depending for example on the angular deviation ψc (angle between the longitudinal axis of the aircraft A and the straight line tangent to the trajectory TR at the level of the target point H). The speed thus calculated constitutes the speed command to be followed; and in the second embodiment 1B, corresponding to the preferred embodiment, the device 1 comprises means making it possible to implement a predictive control. This predictive control makes it possible to take account of the response times of the actuators (engines and brakes) and of the dynamics of the aircraft A so as to anticipate the changes of speed (acceleration, deceleration) of the speed profile PV. Because of the different dynamics of the brakes and engines, a predictive control is implemented, in this case, for each type of actuator. The device 1B comprises means 6B which make it possible to select, as a function of the form of the speed profile (that is to say if, at the prediction horizon of the brakes and/or engines, the profile accelerates or decelerates), the predictive control (out of the aforesaid two) to be weighted by the weighting factor, the resulting speed being the speed to be controlled.

In a preferred application, said device 1 forms part of a system 37 which is intended for the automatic longitudinal guidance of the aircraft A rolling on the ground along the trajectory TR.

Figure 7:
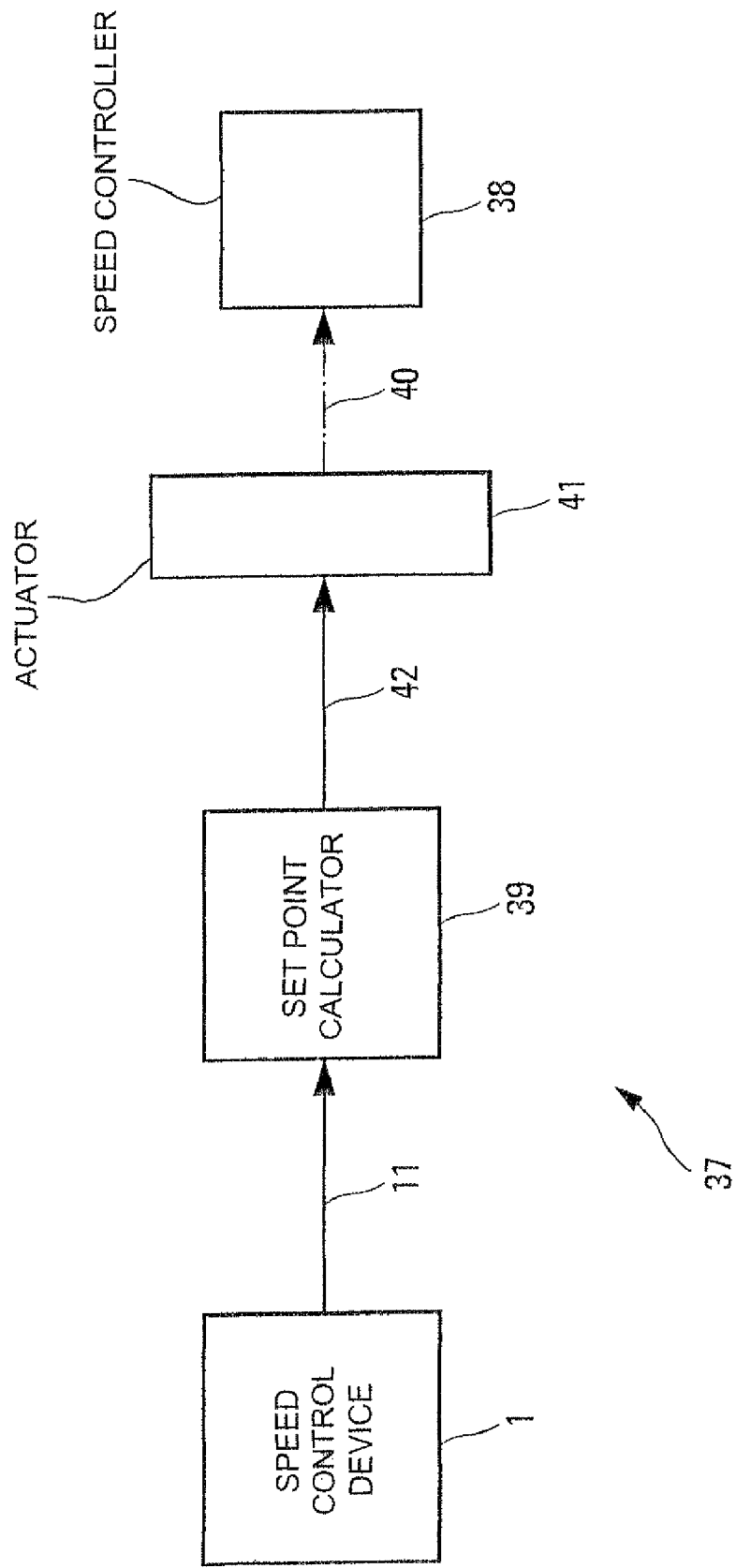
FIG. 7 is the schematic diagram of a system for the automatic longitudinal guidance of an aircraft, which comprises a device in accordance with the invention.

As represented in FIG. 7, this system 37 comprises, in addition to said device 1 (which is embodied according to any one of the embodiments 1A and 1B):

control means 38, for example engines and/or brakes, which act on the (longitudinal) speed of the aircraft A;

means 39 which are connected by way of the link 11 to said device 1 and which are intended to calculate setpoints able to be applied to said control means 38. These setpoints are such that applied to said control means 38, the latter control the aircraft A according to said controlled speed Vc (or Vlim) received from said device 1 through the link 11; and standard means 41, for example actuators of the engines or brakes, which are connected by way of a link 42 to said means 39 and which are formed so as to apply, in a standard manner, the setpoints calculated by said means 39 to said control means 38, as illustrated by a chain-dotted link 40.

The system 37 in accordance with the invention makes it possible, in particular:

to reduce the workload of the pilot in the course of a movement phase, by handling the tracking of the speed profile PV of the aircraft A on the ground, thereby enabling the pilot to concentrate on other tasks, such as the lateral guidance of the aircraft A, the monitoring of the exterior environment (movement of the other vehicles, surrounding obstacles) or communications with the air/ground traffic control;

to follow the speed profile PV envisaged with greater precision than with manual piloting so as to comply as far as possible with the time and arrival constraints which are envisaged by this speed profile PV;

to optimize the use of actuators of the aircraft A more than with manual piloting, with in particular fewer activations of the brakes and engines; and to monitor, and optionally to limit, the controlled speed so as to comply with the aforesaid operational and regulatory constraints. This is advantageous in particular in the case where the lateral guidance, that is to say the orientation of the aircraft A with a view to following the trajectory TR, is carried out in manual mode, so as, in particular, to be able to automatically limit the speed as a function of the yaw moments of the aircraft A, of the state of the pavement and tires, as well as of admissible loads on the main gear of the aircraft. Furthermore, in the case where the lateral guidance is carried out in an automatic manner, the device 1 and the system 37 in accordance with the invention make it possible to check that the speed envisaged by the speed profile PV complies properly with the aforesaid constraints.

The invention claimed is:

1. A method of generating a controlled speed for an aircraft along a ground trajectory, comprising the steps of:
   a) receiving a ground trajectory comprised of a series of successive elements and receiving a speed profile which defines, for each element of the ground trajectory, associated speed values;
   b) measuring a current position of the aircraft;
   c) calculating an interpolated speed of the speed profile that corresponds to the current position of of the aircraft, wherein the interpolated speed is calculated on the basis of said ground trajectory, said speed profile and said current position;
   d) calculating, by a weighting factor calculation unit, a weighting factor from an angular deviation, wherein the angular deviation is calculated by an angular deviation calculation unit from a measured current aircraft heading and the ground trajectory;
   e) determining an auxiliary speed from said interpolated speed; and
   f) multiplying the determined auxiliary speed by said weighting factor to generate said controlled speed which represents a longitudinal speed command that commands the aircraft to move along said ground trajectory while complying with said speed profile.

2. The method as claimed in claim 1, wherein said auxiliary speed corresponds to said interpolated speed.

3. A method of generating a controlled speed for an aircraft along a ground trajectory, comprising the steps of:
   a) receiving a ground trajectory comprised of a series of successive elements and receiving a speed profile which defines, for each element of the ground trajectory, associated speed values;
   b) measuring a current position of the aircraft;
   c) calculating an interpolated speed of the speed profile that corresponds to the current position of the aircraft, wherein the interpolated speed is calculated on the basis of said ground trajectory, said speed profile and said current position;
   d) calculating, by a weighting factor calculation unit, a weighting factor from an angular deviation, wherein the angular deviation is calculated by an angular deviation calculation unit from a measured current aircraft heading and the ground trajectory;
   e) determining an auxiliary speed from:
      a first predicted speed, which is determined from the speed profile at a first prediction horizon, wherein the first prediction horizon is based on a response time of the aircraft engines,
      a first predictive speed control, which is calculated from the first predicted speed,
      a second predicted speed, which is determined from the speed profile at a second prediction horizon, wherein the second prediction horizon is based on a response time of the brakes of the aircraft, and
      a second predictive speed control, which is calculated from the second predicted speed; and
   f) multiplying the determined auxiliary speed by said weighting factor to generate said controlled speed which represents a longitudinal speed command that commands the aircraft to move along said ground trajectory while complying with said speed profile.

4. The method as claimed in claim 3, wherein said first predicted speed is determined from:
   a curvilinear abscissa attained at said first prediction horizon, wherein the curvilinear abscissa is determined from said ground trajectory; and
   a speed profile corresponding to the determined curvilinear abscissa.

5. The method as claimed in claim 3, wherein said second predicted speed is determined from:
   a curvilinear abscissa attained at said second prediction horizon, wherein the curvilinear abscissa is determined from said ground trajectory; and
   a speed profile corresponding to the determined curvilinear abscissa.

6. A method of generating a controlled speed for an aircraft along a ground trajectory, comprising the steps of:
   a) receiving a ground trajectory comprised of a series of successive elements and receiving a speed profile which defines, for each element of the ground trajectory, associated speed values;
   b) measuring a current position of the aircraft;
   c) calculating an interpolated speed of the speed profile that corresponds to the current position of the aircraft, wherein the interpolated speed is calculated on the basis of said ground trajectory, said speed profile and said current position;
   d) calculating, by a weighting factor calculation unit, a weighting factor from an angular deviation, wherein the angular deviation is calculated by an angular deviation calculation unit from a measured current aircraft heading and the ground trajectory;
   e) determining an auxiliary speed from the calculated interpolated speed; and
   f) multiplying the determined auxiliary speed by said weighting factor to generate said controlled speed which represents a longitudinal speed command that commands the aircraft to move along said ground trajectory while complying with said speed profile, wherein the controlled speed is generated by measuring current yaw rate rmes of the aircraft, and generating the controlled speed Vc from the following relation:

$$Vlim = \min(Vc, (Ny \cdot g)/rmes, Vreg, Vtr, Vadh)$$

wherein
Vlim is a limit for the controlled speed,
Ny is a lateral load factor,
g is acceleration due to gravity,
Vreg is maximum regulatory speed on the airport domain,
Vtr is maximum load speed of the aircraft, and
Vadh is maximum tire grip speed of the aircraft.

* * * * *